US008931948B2

(12) United States Patent
Coy

(10) Patent No.: US 8,931,948 B2
(45) Date of Patent: Jan. 13, 2015

(54) PROCESS AND APPARATUS FOR MIXING A FLUID WITHIN A VESSEL

(75) Inventor: Daniel C. Coy, Naperville, IL (US)

(73) Assignee: BP Corporation North America Inc., Houston, TX (US)

( * ) Notice: Subject to any disclaimer, the term of this patent is extended or adjusted under 35 U.S.C. 154(b) by 975 days.

(21) Appl. No.: 12/243,424

(22) Filed: Oct. 1, 2008

(65) Prior Publication Data

US 2010/0080077 A1 Apr. 1, 2010

(51) Int. Cl.

| | |
|---|---|
| ***B01F 15/02*** | (2006.01) |
| ***B01F 15/04*** | (2006.01) |
| ***B01F 15/00*** | (2006.01) |
| ***G05D 11/02*** | (2006.01) |
| ***B01F 3/08*** | (2006.01) |
| ***B01F 5/10*** | (2006.01) |
| ***B01F 5/24*** | (2006.01) |
| ***B01F 5/02*** | (2006.01) |
| ***B01F 7/06*** | (2006.01) |

(52) U.S. Cl.

CPC ............. *B01F 5/0206* (2013.01); *B01F 5/0212* (2013.01); *B01F 5/10* (2013.01); *B01F 7/06* (2013.01)

USPC ........ 366/136; 366/137; 366/131; 366/153.1; 366/152.6; 366/155.1; 366/160.1; 366/160.2; 366/160.3; 366/160.4; 366/160.5; 366/162.1; 366/167.1

(58) Field of Classification Search

CPC .......... B01F 15/02; B01F 15/04; B01F 15/00; B01F 3/08; B01F 3/0861; B01F 3/0869; B01F 5/10; B01F 5/102; B01F 5/108; B01F 5/24; B01F 5/241; B01F 5/242; G05D 11/02

USPC ........ 366/136, 137, 131, 153.1, 152.6, 155.1, 366/160.1–160.5, 162.1, 167.1

See application file for complete search history.

(56) References Cited

U.S. PATENT DOCUMENTS

| | | | | |
|---|---|---|---|---|
| 2,322,087 A | | 6/1943 | Atwood et al. | 259/18 |
| 2,577,797 A | * | 12/1951 | Moyer | 366/136 |
| 3,847,375 A | | 11/1974 | Kuerten et al. | 259/4 |
| 4,097,026 A | | 6/1978 | Haindl | |

(Continued)

FOREIGN PATENT DOCUMENTS

| | | |
|---|---|---|
| DE | 2447337 | 4/1976 |
| DE | 2447337 A1 | 4/1976 |

(Continued)

OTHER PUBLICATIONS

Tyco/Flow Control, Varec 7700 Series Floating Suction Unit, 2003 Tyco International Ltd.

(Continued)

*Primary Examiner* — Richard Crispino
*Assistant Examiner* — Matthew Hoover
(74) *Attorney, Agent, or Firm* — Kelly L. Cummings

(57) ABSTRACT

This invention relates to a process and an apparatus for mixing a fluid or a liquid within a vessel or a tank. The invention includes an apparatus with an inlet device and a mixer. The invention mixes crude oils and/or other hydrocarbon materials to a homogenous state with surprising and unexpected high efficiency. The invention includes methods of using the apparatus to mix the contents of the vessel and/or two stratified materials. The invention includes the ability to mix materials having disparities in density and/or viscosity.

13 Claims, 8 Drawing Sheets

(56) References Cited

U.S. PATENT DOCUMENTS

| | | | | |
|---|---|---|---|---|
| 5,938,326 | A * | 8/1999 | Krivohlavek et al. | 366/137 |
| 6,217,207 | B1 | 4/2001 | Streich et al. | |
| 2005/0281131 | A1 | 12/2005 | Yungblut | |

FOREIGN PATENT DOCUMENTS

| | | | |
|---|---|---|---|
| JP | S54128011 | A | 10/1979 |
| JP | 60007926 | | 1/1985 |
| WO | 97/41976 | A1 | 11/1997 |
| WO | 99/32238 | A1 | 7/1999 |
| WO | WO 01/03816 | A1 | 1/2001 |

OTHER PUBLICATIONS

Schutte & Koerting, 2007 http://www.s-k.com/im/dr_01_04_app1.gif.

Kayode A. Coker, Elsevier Publishing, Ludwig's Applied Process Design for Chemical Petrochemical Plants, vol. 1 ($4^{th}$ Edition), dated Jul. 6, 2007.

Edward L. Paul et al. Handbook of Industrial Mixing; Science and Practice; John Wiley & Sons, 2004.

Nicholas P. Cheremisinoff, Handbook of chemical processing equipment, British Library Cataloguing in Publication Data, 2000.

Masoud Rahimi and Arsalan Parvareh, CFD Study on mixing by Coupled jet-impeller mixers in a large crude oil storage tank, vol. 31, Issue 7, Jul. 2007, pp. 737-744, ScienceDirect—Computers & Chemical Engineering.

Dakhel, Asghar Alzadeh, Journal of Petroleum Science & Engineering, 43 (2004) 151-161, CFD Simulation of Homogenization in Large-Scale Crude Oil Storage Tank dated Jan. 20, 2004.

European Patent Office, Office Action of corresponding EP Application No. 09 792 604.2-1703, dated Dec. 2, 2013, 5 pages.

* cited by examiner

PROCESS AND APPARATUS FOR MIXING A FLUID WITHIN A VESSEL

BACKGROUND

1. Technical Field

This invention relates to a process and an apparatus for mixing a fluid or a liquid within a vessel or a tank.

2. Discussion of Related Art

The recent trend of higher prices in crude oils and the availability of supply necessitates that refineries have the abilities to process various different types of crude oils, while providing consistent and safe operations of the process units. One way that refineries seek to capture economic benefits of crude feedstock flexibility is by blending various feedstocks before processing in the crude oil distillation unit or pipe still, such as blending a less expensive heavy crude oil with a lighter crude oil. A typical manner to blend the crude oil materials is in the crude oil storage tanks. The crude oil storage tanks hold large volumes, such as up to about 125,000 meters cubed.

Known devices for mixing crude oil tanks include side entry agitators with marine type propellers. These agitators do not satisfactorily mix the two or more crude oils and significant operational and safety issues arise as the unmixed crude is supplied to the refinery. Recent publications in scientific journals disclose using computational fluid dynamics to model crude oil tank mixing with agitators and/or combining the agitator with a jet mixer.

Cheremisinoff in the "Handbook of chemical process equipment" states for blending to practical homogeneity, ten tank turnovers are recommended and for blending to an approximate 1 percent deviation between top and bottom sample points in a tank, three tank turnovers are normally adequate. Similarly, Paul in "Handbook of industrial mixing: science and practice" states for a liquid with a viscosity of less than 100 centipoise 3 turnovers are needed to reach 95 percent homogeneity in a tank, and for a viscosity of 100 centipoise to less than 1000 centipoise 10 turnovers are needed to reach 95 percent homogeneity in a tank.

Atwood, U.S. Pat. No. 2,322,087, discloses an eductor tank mixer where the entrained fluid is drawn simultaneously from all levels of fluid within the tank. The orifices of the intake mixing tube are proportioned that the amount drawn from each level increases upwardly along the intake mixing tube.

Kuerten et al., U.S. Pat. No. 3,847,375, discloses a method of mixing liquids which differ greatly from one another as regards their volume and/or density. The liquid dispersing agent is passed into in impulse exchange chamber.

Colebrander, International Publication Number WO01/03816, discloses a method of introducing a first liquid in a stirred vessel containing a second liquid by injecting the first liquid into the stirred vessel, wherein a ratio of injection velocity over impeller tip speed is greater than 2.

Although the foregoing disclosures provide advances in the art, there is still a need and a desire to rapidly mix and/or homogenize a contents of a vessel. There is also a need and a desire to mix a first liquid stratified on a second to make a uniform feed to a process unit. Furthermore, there is a need and a desire to mix liquids with density and/or viscosity differences.

SUMMARY

The above identified needs and desires are met at least in part by a process and an apparatus for mixing a fluid or a liquid within a vessel or a tank. The invention includes an apparatus with an inlet device and a mixer. The invention mixes contents of crude oil tanks and/or other hydrocarbon materials to a homogenous state with surprising and unexpected high efficiency. The invention includes methods of using the apparatus to mix the contents of the vessel and/or two or more stratified materials. The invention includes the ability to mix materials having disparities in density and/or viscosity.

According to a first embodiment, this invention includes a fluid mixing apparatus. The mixing apparatus includes a vessel for containing a liquid with a liquid level, an inlet device movable with the liquid level, a motive force device with a suction and a discharge where the suction fluidly connects to the inlet device, and at least one mixer where the mixer fluidly connects to the discharge.

According to a second embodiment, this invention includes a method of mixing a liquid in a vessel. The method includes moving an inlet device based on a liquid level, withdrawing a portion of the liquid with the inlet device, and returning the portion of the liquid to a different part of the vessel with at least one mixer.

According to a third embodiment, this invention includes a method of mixing a first fluid stratified on a second fluid. The method includes moving an inlet device based on a liquid level of the first fluid, withdrawing a portion of the first fluid with the inlet device, and combining the portion of the first fluid with a portion of the second fluid by at least one mixer.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention. In the drawings.

DETAILED DESCRIPTION

The present invention relates to an apparatus and a method to achieve optimum blend time (reduced) and uniformity in vessel contents, such as where the contents are stratified by differences in density of greater than approximately 2 kilograms per meter cubed and/or viscosities greater than approximately 10 centipoises. Quickly making or forming a uniform blend includes several industrial advantages. A first advantage may include a uniform crude oil supply to a refinery to prevent process upsets due to abrupt changes in crude feed properties and thus allow operation at peak throughput and economic value. A second advantage may include a uniform intermediate storage in a refinery to prevent process upsets due to abrupt changes in intermediate feed properties and thus allow operation at peak throughput and economic value. A third advantage may include a uniformly blended final product to reduce "value giveaway" when a product blend is targeted above specification so that all (non-well blended) samples meet the specification.

These and other advantages of the invention can be met at least in part by an apparatus that according to one embodiment may include a floating suction for withdrawing liquid substantially at the liquid surface (independent of the liquid level in the tank), a pump for circulating the liquid back to the tank, and a distributed set of jet mixers (simple nozzles, eductors, or the like) located to educe fluid substantially from the bottom of the tank.

Desirably, the present invention synergistically combines a floating suction with distributed jet mixing to produce a surprising result. In the present invention, lower density fluid can be continuously drawn from approximately the top 5 percent of the fluid in the tank and intimately mixed in the eductors or jet mixers with higher density fluid from approximately the bottom 5 percent of the tank to produce an intermediate density mixture that moves and/or flows to or toward a center layer in the tank and continues to be mildly agitated by the mixer outflow. The bulk mixing can be facilitated and/or driven by inertial driven forces and/or buoyancy driven forces, for example. The tank can be uniformly mixed (less than 1 percent concentration difference between top and bottom) in about 0.6 tank turnovers.

Figure 1:
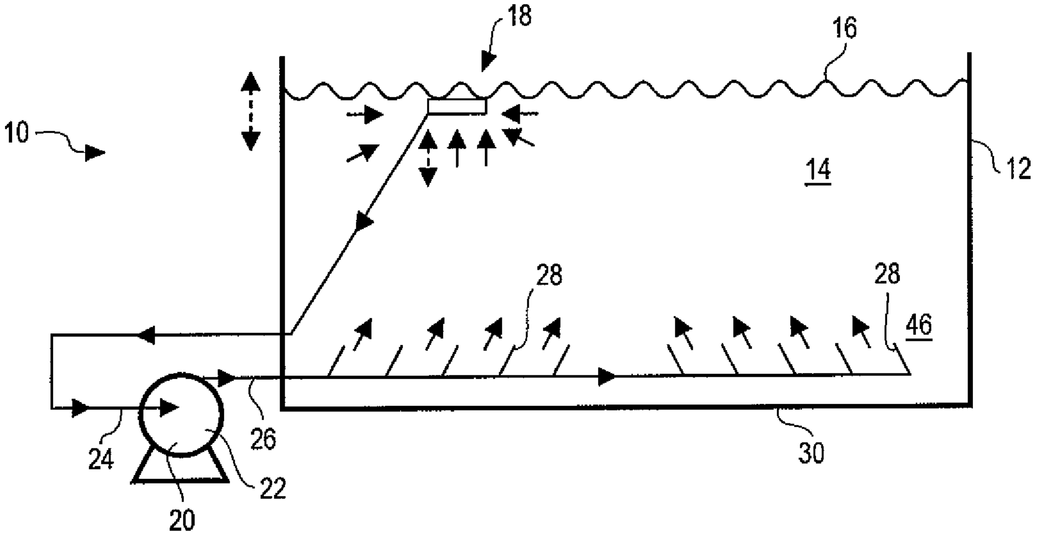
FIG. 1 illustrates a mixing apparatus, according to one embodiment.

As shown in FIG. 1 and according to one embodiment, a fluid mixing apparatus 10 may include a vessel 12, such as an open top tank to contain a liquid 14 with a liquid level 16. The fluid mixing apparatus 10 may further include an inlet device 18 fluidly connected with respect to a motive force device 20, such as a centrifugal pump 22. The inlet device 18 may connect to a suction 24, and the motive force device 20 may include a discharge 26. The discharge 26 may fluidly connect with respect to at least one mixer 28, such located on or near a bottom 30 of the vessel 12. The bottom 30 desirably includes a different location 46 from the inlet device 18.

The liquid 14 can be drawn into the inlet device 18 near the top of the liquid level 16 and flow to the motive force device 20 before flowing out of the at least one mixer 28 near the bottom 30 of the vessel 12.

Figure 2:
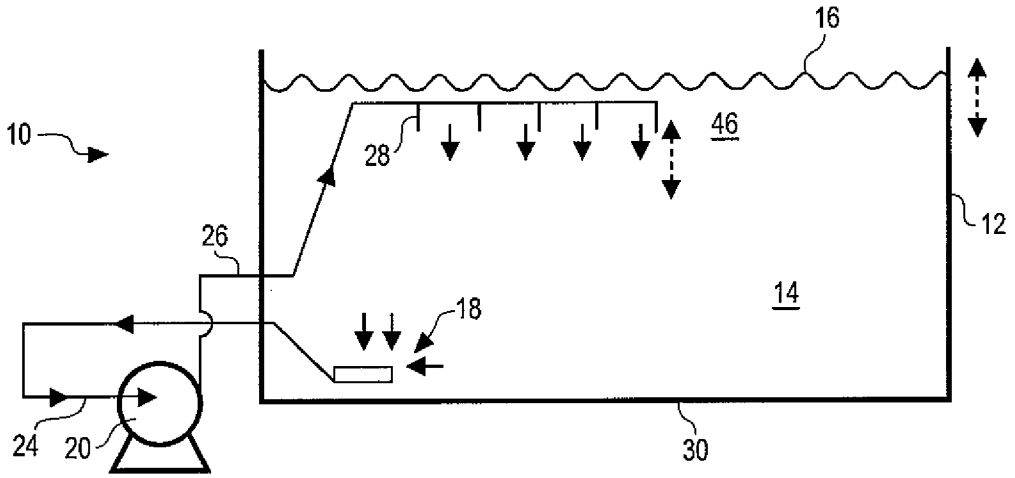
FIG. 2 illustrates an inverted mixing apparatus, according to one embodiment.

As shown in FIG. 2 and according to one embodiment, a fluid mixing apparatus 10 with a vessel 12 may include a relatively inverted configuration, such as generally opposite that of FIG. 1, for example. The same components can be reconfigured or rearranged to allow liquid 14 to flow from the bottom 30 with an inlet device 18 through a motive force device 20 with a suction 22 and a discharge 26, and out at least one mixer 28 at or near the liquid level 16 and a different location 46 from the inlet.

Figure 3:
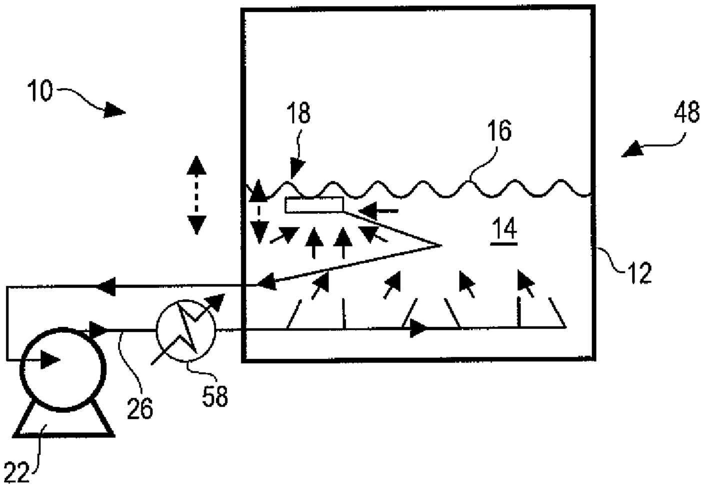
FIG. 3 illustrates a mixing apparatus in a ½ full tank, according to one embodiment.

As shown in FIG. 3 and according to one embodiment, a fluid mixing apparatus 10 with a fixed roof tank may include a heat exchanger 58, such as for cooling and/or heating during circulation. The heat exchanger 58 may be placed at any suitable location, such as after a discharge 26 of a pump 22, inserted into the vessel 12, and/or any other position to thermally contact the liquid 14.

The inlet device 18 may include a flexible elbow or other suitable bending configuration, such as for a half full tank 48 with a height greater than a diameter or a length, for example.

Figure 4:
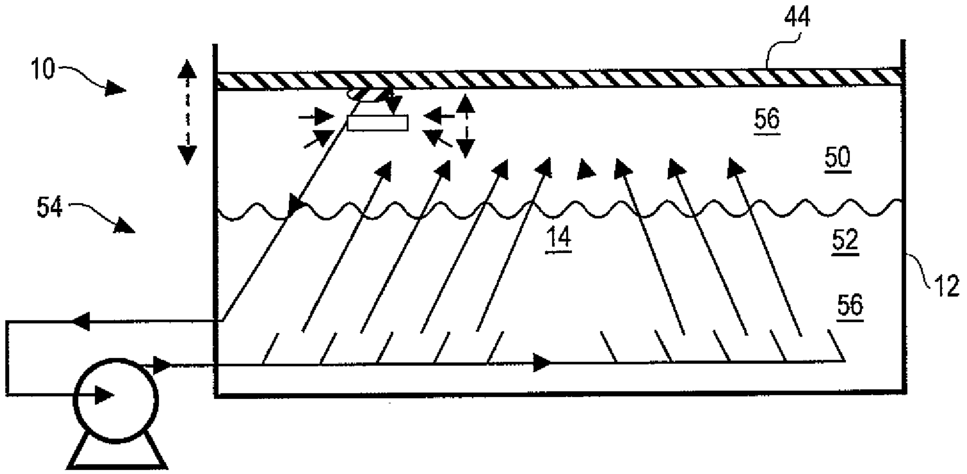
FIG. 4 illustrates a stratified contents of a tank with a mixing apparatus, according to one embodiment.

As shown in FIG. 4 and according to one embodiment a fluid mixing apparatus 10 may be installed with a floating roof 44. A liquid 14 may include a first fluid 50 on a second fluid 52, such as to form a stratified system 54 and having more than one layer 56 before mixing.

Figure 5A:
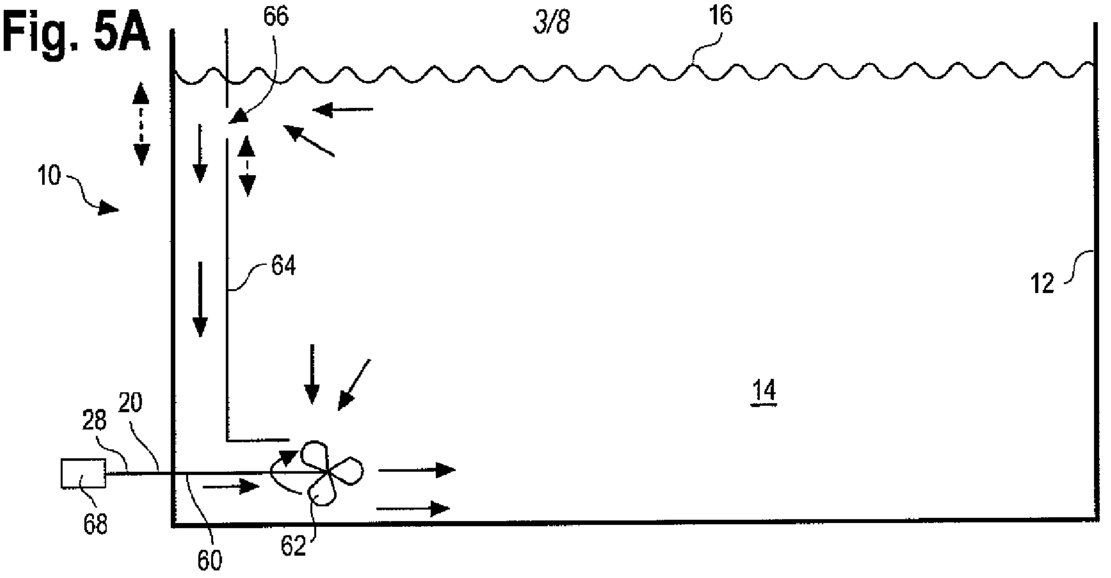
FIG. 5A illustrates a combined mixing device and a motive force device, according to one embodiment.
Figure 5B:
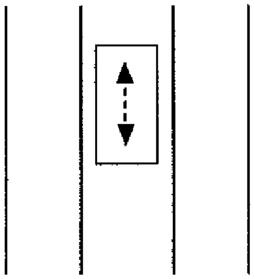
FIG. 5B illustrates a floating window, according to one embodiment.

As shown in FIG. 5A and according to one embodiment, a fluid mixing apparatus 10 may be installed internal to a vessel 12, such as with a shroud 64 having a moving window 66 to follow a liquid level 16 of the liquid 14. The flow can be through the moving window 66 and down the shroud 64, such as drawn by a motive force device 20 that is also the same as at least one mixer 28. The combined device may include an agitator 60, such as with an impeller 62 and a driver 68. The driver 68 may include a motor or a turbine external to the vessel 12. FIG. 5B shows the moving window 66 slidable between two guides and/or rails, such as moving with the liquid level 16. Other configurations of the moving window 66 are possible without departing from the scope of the invention.

Figure 6A:
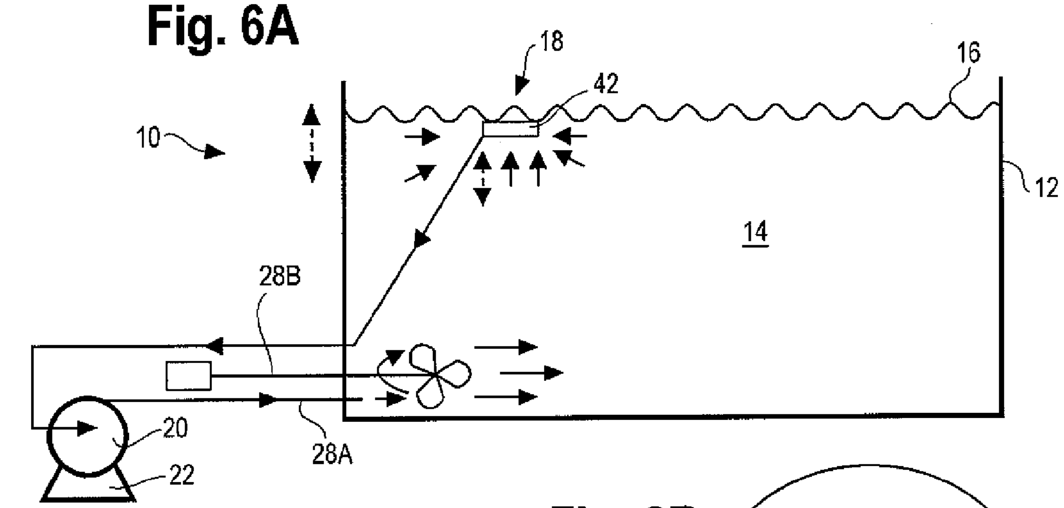
FIGS. 6A and 6B illustrate a combined mixing device, according to one embodiment.
Figure 6B:
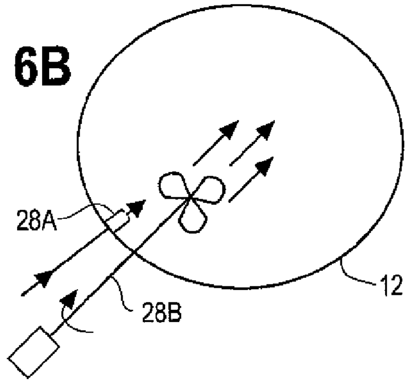

According to one embodiment and as shown in FIGS. 6A and 6B, a fluid mixing apparatus 10 may include a mixer 28A, such as horizontal nozzle for a combination mixing device, and a mixer 28B, such as an agitator for a combination mixing device. Combining more than one type of mixing device may include synergistic effects when fluidly connected with inlet device 18 and/or motive force device 20. Desirably, the liquid 14 can be drawn by a pump 22 through a floating suction 42, and injected at or near an impeller mixer 28B, such as the primary fluid enters the high shear zone of the agitator, for example. In the alternative, the combination mixing device may direct the flow of the nozzle mixer 28A to join the discharge of the impeller mixer 28, such as towards a center of the vessel 12. The combination mixing device configuration may advantageously be operated in a tank with a floating roof. Other configurations of floating suction 42 with combination mixing devices 28A and 28B are possible without departing from the scope of the invention.

Figure 7A:
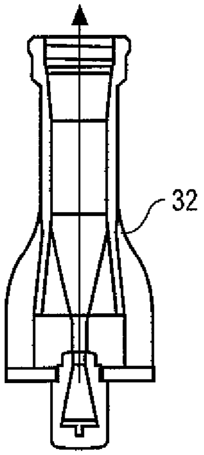
FIGS. 7A and 7B illustrate an eductor, according to certain embodiments.
Figure 7B:
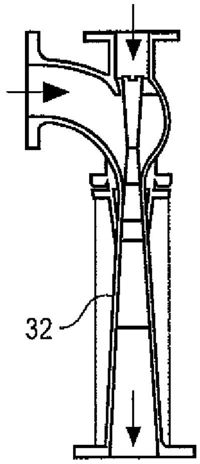
Figure 7C:
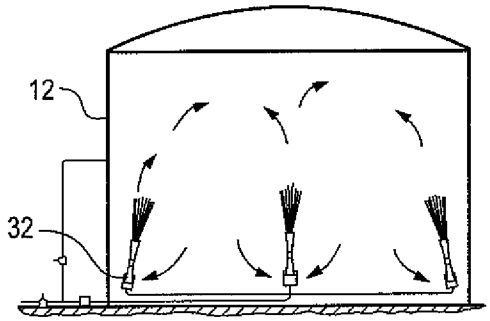
FIG. 7C illustrates an eductor flow pattern, according to one embodiment.
Figure 8A:
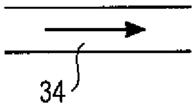
FIGS. 8A-8H illustrate nozzles, according to certain embodiments.
Figure 8B:
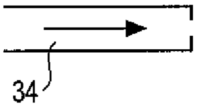
Figure 8C:
Figure 8D:
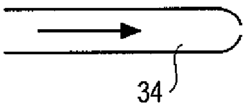
Figure 8E:
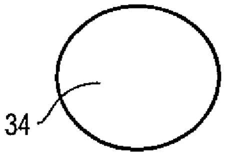
Figure 8F:
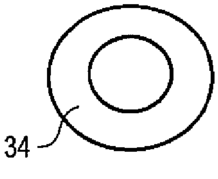
Figure 8G:
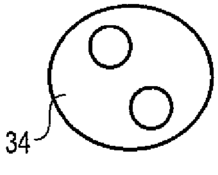
Figure 8H:
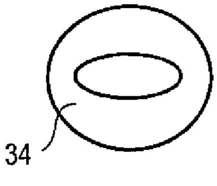

According to one embodiment and as shown in FIGS. 7A and 7B, this invention may include an eductor 32 for the at least one mixer. The primary fluid and the secondary fluid may include any suitable configuration, such as generally coaxial as in FIG. 7A and/or generally perpendicular as in FIG. 7B. FIG. 7C shows a one possible flow pattern with eductors 32 in vessel 12. Other configurations of eductors 32 beyond those shown in FIGS. 7A-7C are within the scope of this invention.

According to one embodiment and as shown in FIGS. 8A-8H, this invention may include a nozzle 34 for the at least one mixer. Typically, but not necessarily, the nozzle may include a reduced cross sectional area to increase velocity of the fluid, such as one or more holes, apertures, bores, orifices, and/or the like. Other configurations of nozzles 34 beyond those shown in FIGS. 8A-8H are within the scope of this invention.

Figure 9A:
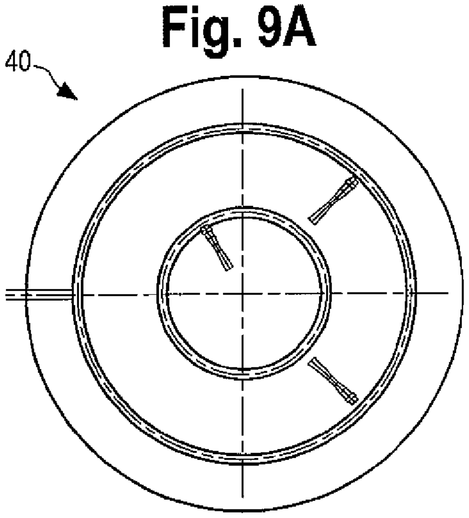
FIG. 9A illustrates a circular manifold, according to one embodiment.
Figure 9B:
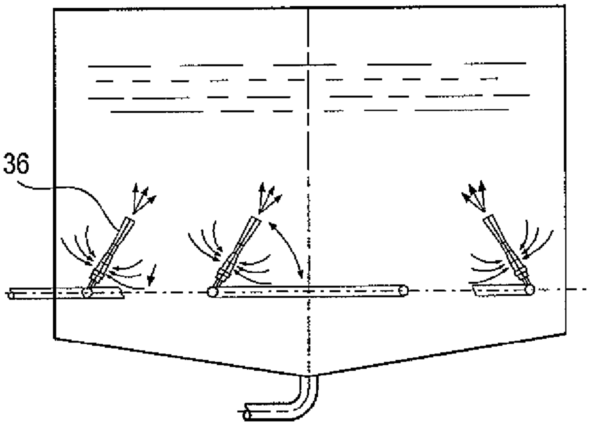
FIG. 9B illustrates a side sectional view of FIG. 9A, according to one embodiment.
Figure 9C:
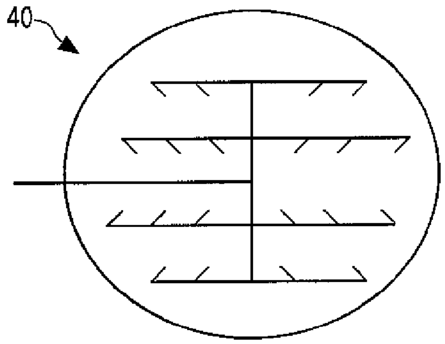
FIG. 9C illustrates a linear manifold, according to one embodiment.
Figure 9D:
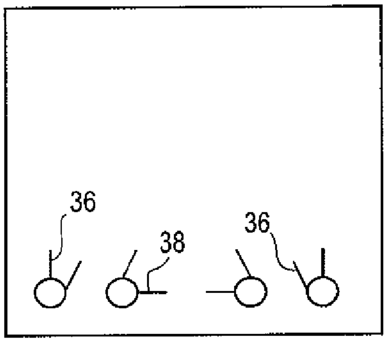
FIG. 9D illustrates a side sectional view of FIG. 9C, according to one embodiment.

As shown in FIGS. 9A-9D and according to one embodiment, distributed mixing devices 40 may include a generally circular manifold seen in FIGS. 9A and 9B (additional eductors are possible). In the alternative, the distributed mixing devices 40 may include a generally linear manifold seen in FIGS. 9C and 9D. The distributed mixing devices 40 may include any suitable angle, such as an upward angle 36 and/or a horizontal angle 38.

Figure 10:
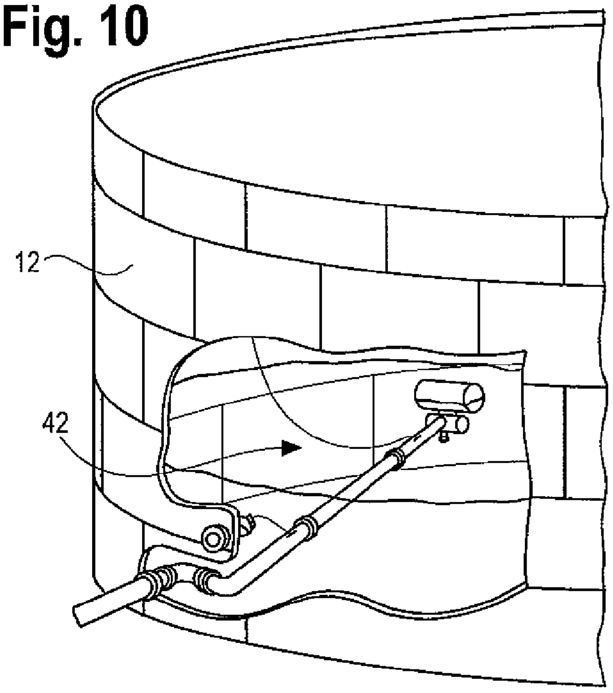
FIG. 10 illustrates a floating suction, according to one embodiment.

As shown in FIG. 10 and according to one embodiment, this invention may include a floating suction 42, such as with a float, a swivel or pivot, a tether line, and/or the like.

According to one embodiment, this invention may include a fluid mixing apparatus. The apparatus may include a vessel for containing a liquid with a liquid level, an inlet device movable with the liquid level, a motive force device with a suction and a discharge, where the suction fluidly connects to the inlet device, and at least one mixer that fluidly connects to the discharge.

A vessel broadly refers to a suitable liquid containing and/or holding device, such as tanks, drums, pipes, ponds, basins, bullets, caverns, spheres, and/or the like. Vessels may include any suitable size, height, length, diameter, and/or shape. According to one embodiment the vessel can include open top tanks, fixed roof tanks, floating roof tanks, internal floating roof tanks, underground storage facilities, and/or the like. The vessel may include a ratio of height to diameter of any suitable number, such as about 1:10, about 10:1, and/or desirably at least about 1:3. According to one embodiment, the vessel comprises a crude oil storage tank, an intermediate refinery stream storage tank, a finished refinery product storage tank, and/or the like.

A liquid generally refers to fluids with no independent shape, but with an at least generally definite volume, such as noncompressible materials and/or slightly compressible materials. Liquids may include suspensions and/or particulate matter, such as slurries. Liquids may include dissolved solids, suspended solids, and/or gases. Liquids may include neat materials as well as mixtures, emulsions, and/or solutions. Mixtures, emulsions, and/or solutions may include a single phase or layer, and/or multiple phases or layers. In the alternative, liquids include materials having a general state of matter that excludes solids and/or gases. According to one embodiment, the liquid may include crude oil, bitumen, tar sands materials, residual materials (for example, crude tower bottoms and/or vacuum tower bottoms), asphaltic streams, other refinery streams, intermediate streams, finished products, and/or any other suitable materials. A liquid may include multiple layers stratified by density viscosity and/or the like.

A liquid level generally refers to a top surface and/or height of the liquid column, such as at the air to liquid interface for an open top tank, and/or generally where a floating roof resides with respect to the liquid, for example. Individual layers of liquids stratified on top of each other may each include a respective liquid level. The liquid level may include any suitable amount of a working volume within the vessel, such as at least about 20 percent, at least about 50 percent, at least about 70 percent, at least about 90 percent, about 100 percent, and/or any other suitable amount. According to one embodiment, a height of the liquid in the vessel comprises less than about half a height of the vessel.

An inlet device broadly refers to any suitable fluid gathering device, such as a nozzle, a pipe inlet, a trough, a channel, and/or the like. The inlet device may include any suitable configuration and/or orientation, such as pointing generally upward, downward and/or any other angle. The ability of the inlet device to move, track, adjust and/or be movable with a liquid level may include moving at and/or on the liquid level, moving below or offset from the liquid level, and moving above the liquid level, such as above a first liquid level in a stratified tank. The offset may include any suitable amount, such as about 1 meter, about 2 meters, or about 5 meters above or below the liquid level. According to one embodiment, the inlet device moves at about 1 meter below the liquid level and includes an upward orientation, such as to draw material from near the surface.

The inlet device may include any suitable mechanical components, such as a float, a buoyancy device, a pipe, a swivel joint, a hinged connection, a sliding pipe system, a flex joint, an expansion bellows, a relatively rigid hose, and/or the like. According to one embodiment, the inlet device comprises a floating suction, such as at or near a top of the liquid level. Desirably, but not necessarily, the inlet device can move with a floating roof within the vessel, such as on a track arrangement. For vessels with a diameter in excess of a height, the inlet device may include a float, a pipe, and a swivel joint configuration. For vessels with a height in excess of a diameter, the inlet device may further include one or more hinged joints, such as to allow the pipe to bend and/or fold onto itself. Other configurations of the inlet device are possible without departing from the scope of this invention.

Desirably, the inlet device adjusts and/or moves with the liquid level. The inlet device can provide adequate flow for at least the majority of the working volume of the vessel, such as the ranges discussed above regarding liquid level. The inlet device may include any suitable configuration. According to one embodiment, the inlet device includes a single opening and/or aperture, such as excluding a plurality of orifices. Desirably, but not necessarily, the inlet device takes or draws fluid in only in one relativity discrete level and/or location, such as near the liquid level and not at multiple levels and/or locations within the vessel at the same time.

A motive force device broadly includes any suitable mechanism for transporting a fluid from one location to another, and/or increasing a pressure and/or a velocity of the fluid, such as with input of power. Motive force devices may include, without limitation, pumps, positive displacement pumps, centrifugal pumps, submersible pumps, eductors, impellers, agitators, and/or the like. The motive force device may be located and/or connected in any suitable configuration with respect to the other parts of the system, such as between the inlet device and the mixer. In the alternative, the motive force and the mixer can be the same device, such as an agitator that draws material through the inlet and mixes on the discharge. The motive force device may be located outside the vessel and/or inside the vessel.

A suction generally refers to an inlet and/or an area or location of generally lower pressure. A discharge generally refers to an outlet and/or an area or location of generally higher pressure. According to one embodiment, the suction and the discharge of the motive force device may be fluidly connected, such as by a kick back and/or minimum flow line.

Fluidly connected and/or in fluid communication broadly refers to a liquid being able to flow and/or be transported from one location to another. Fluid connections may be made by any suitable manner, such as with pipes, tubing, channels, conduits, shrouds, baffles, weirs, placing items in close proximity, and/or the like.

A mixer broadly refers to any suitable device for increasing homogeneity of a fluid system and/or reducing gradients, such as with input of power and/or agitation. Mixers used in homogeneous systems may beneficially impart turbulence, for example. The mixer may include any suitable apparatus, such as a nozzle, an eductor, an ejector, an agitator, an impeller, a propeller, a mixing tee, a static mixer, a mixing valve, and/or the like. According to one embodiment, the mixer includes the end of pipe.

The mixer may include any suitable location, such as mounting or locating at or near a bottom of the vessel. According to one embodiment, the mixer mounts about 1 meter above a floor or bottom of the vessel.

Desirably, the mixer includes shear mixing and/or intimate mixing, such as between the fluid from the inlet device and the fluid immediately surrounding the mixer, for example. Shear mixing can generally occur down to a molecular diffusional level.

Also desirably, the mixer includes bulk mixing, such as between the fluid from the inlet device and the fluid not immediately surrounding the mixer, for example. Bulk mixing can generally occur with momentum, inertial, and/or buoyancy driven forces.

Nozzles broadly refer to a projection, such as for passing a fluid or a liquid. Nozzles can mix fluids by admitting and/or flowing a second fluid into a first fluid. Desirably, but not necessarily, nozzles can include a taper and/or a profile, such as to increase a velocity of the fluid and/or the liquid. Increased velocity may increase turbulence and/or further promote mixing, such as with momentum driven forces.

Eductors and/or ejectors broadly refer to devices that accelerate a secondary fluid with a primary or driver fluid, such as a steam eductor draws a vacuum on a surface condenser of a condensing turbine. Generally, but not necessarily, the eductor includes a throat, a venturi design, and/or a diffuser, such as to accelerate a velocity of the primary fluid and draw and/or entrain a volume of the secondary fluid. The ratio of the primary fluid to the secondary fluid may include any suitable amount on a volumetric basis, such as about 1:1, 1:2, 1:3, 1:4, 1:5, 1:6, and/or the like. Desirably, the eductor intimately mixes a portion of the primary fluid and the secondary fluid, such as with high shear forces. The primary fluid may include a portion of liquid from another part or section of the vessel, such as on or near the top.

Eductors and sometimes nozzles may be referred to as jet mixers. Jet mixers desirably include no moving parts other than the fluids passing though them. According to one embodiment, this invention uses primary fluids and/or motive fluids through the eductors and/or nozzles that differ from the secondary fluids, surrounding fluids, and/or entrained fluids by density, composition, viscosity, temperature and/or the like.

Agitators broadly refer to devices or an apparatuses for stirring and/or shaking. Agitators may include ultrasonic capabilities, such as vibrating at and/or above about 20 kilohertz and/or any other suitable frequency. Agitators may include devices to input power into a fluid, and may include devices with at least some propulsion and/or fluid movement. Agitators can include motors or drivers located inside and/or outside of the vessel, such as with a shaft. Agitators may operate at any suitable speed, such as directly or indirectly coupled to a drive. According to one embodiment, the agitator makes or causes cavitation and/or excessive cavitation. In the alternative, the agitator does not make or cause cavitation, but still maintains a generally turbulent flow regime. The agitator may optionally operate in a generally laminar flow regime, such as when processing or handling very high viscosity materials.

Propellers broadly refer to devices that may include a generally central hub with radiating blades placed and twisted, such as to form part of a generally helical surface. Desirably, the helical surface imparts motion to the fluid, such as for mixing and/or other movement. The propellers may be mounted on a shaft and/or other suitable power transfer device.

Impellers broadly refer to other configurations of shaft mounted mixing devices, such as those with a generally radial configuration and/or non-helical surfaces. Desirably, the impeller imparts motion to the fluid, such as for mixing and/or other movement. The impellers may be mounted on a shaft and/or other suitable power transfer device.

Mixing tees, mixing valves, static mixers, and the like may generally combine a first fluid with a second fluid, such as with intimate contacting. According to one embodiment, an inlet device draws fluid from the top of the liquid level and a second inlet device draw fluid from the bottom. The fluids can be combined in a mixing tee, a mixing valve, and/or a static mixer before returning to the vessel in a suitable location, such as to a middle location by a return device. The return device may be movable based on a relationship to the first inlet device and/or the second inlet device.

The mixers may include any suitable configuration, such as angling generally upward, angling generally downward, angling generally horizontally, and/or the like. According to one embodiment, a plurality of mixers can be disposed on or with respect to a tank bottom and have some mixers pointed upward and other mixers pointed horizontally, such as to form and/or allow a generally toroidal flow pattern that in cross section includes two generally circular patterns. The toroidal flow pattern may include the fluid moving along the bottom towards the center and turning upwards towards the top and then generally radially dispersing before flowing downward along the tank wall, for example.

The mixers may be arranged in any suitable configuration, such as a plurality of generally distributed mixing devices generally across a bottom of the vessel. The mixers may desirably be arranged in concentric circles, such as supplied from a generally circular manifold or header. In the alternative, the mixers may be arranged in a generally staggered configuration from a generally linear manifold or header. Any suitable number of mixers is within the scope of this invention, such as about 1, at least about 2, at least about 4, at least about 12, at least about 24, at least about 36, at least about 72, at least about 144, at least about 288, and/or the like.

Baffles, weirs, dams, ramps, other flow modifiers, and/or the like may be included with this invention, such as to promote mixing. In the alternative, this invention may exclude from the vessel the use of baffles, weirs, dams, ramps, other flow modifiers, and/or the like. According to one embodiment, this invention may exclude flow in the vessel generally circumferentially along a vertical vessel wall.

As used herein the terms “having”, “comprising”, and “including” are open and inclusive expressions. Alternately, the term “consisting” is a closed and exclusive expression. Should any ambiguity exist in construing any term in the claims or the specification, the intent of the drafter is toward open and inclusive expressions.

Regarding an order, number, sequence and/or limit of repetition for steps in a method or process, the drafter intends no implied order, number, sequence and/or limit of repetition for the steps to the scope of the invention, unless explicitly provided.

According to one embodiment, this invention includes a method of mixing a liquid in a vessel. The method may include moving an inlet device based on a liquid level, withdrawing a portion of the liquid with the inlet device, and returning the portion of the liquid to a different part of the vessel with at least one mixer.

Moving broadly refers to raising, lowering, following, indexing, locating and/or any other suitable action, such as in relation to a changing liquid level. Desirably, the moving may include a generally fixed offset, such as from a top of the liquid level, as discussed above.

Withdrawing broadly refers to pulling, drawing, siphoning, moving, sucking, flowing and/or any other suitable action, such as causing movement of a fluid from a first location to a second location. Withdrawing may include taking material outside of the vessel, such as in a pipe. In the alternative withdrawing may include taking material to a different part or portion of the vessel without leaving the vessel, such as by a baffle and/or shroud.

Returning broadly refers to pushing, flowing, pumping, moving, expelling, and/or any other suitable action, such as causing movement of a fluid from a first location to a second location. Returning may include putting a fluid in or into the vessel from the outside of the vessel, such as with a pipe. In the alternative, the returning may be within the contents of the vessel, such as to a different location than the fluid came from.

The different location may include any suitable location, such as generally opposite the inlet device. According to one embodiment, the withdrawing occurs with respect to a top of a fluid or liquid level and the returning occurs with respect to a bottom part of the vessel. The withdrawing may occur on a bottom of the vessel and the returning may occur on a top of the liquid level. The withdrawing may occur on both the top of the liquid level and the bottom of the vessel and the returning may occur to the generally middle or mid-section of the vessel. Other configurations of vessels and flows are possible without departing from the scope of this invention.

The step of returning may also include applying a motive force to the portion of the liquid, such as with a pump. Desirably, the motive force device includes a suction that fluidly connects with the inlet device and a discharge that fluidly connects with the mixer. The mixer may include any suitable device, such as an eductor, or a nozzle.

The apparatus and the method of this invention thoroughly mix the contents of the vessel. According to one embodiment, the liquid includes a liquid volume, and a contents of the vessel becomes generally homogenous following less than about 1.0 turnover of the liquid volume returned through the at least one mixer, following less than about 0.8 turnovers of the liquid volume returned through the at least one mixer, following less than about 0.6 turnovers of the liquid volume returned through the at least one mixer, following less than about 0.4 turnovers of the liquid volume returned through the at least one mixer, following less than about 0.2 turnovers of the liquid volume returned through the at least one mixer, and/or the like.

Homogenous broadly refers to a lack of composition gradients or a lack of thermal gradients of greater than about 1 percent of an initial gradient for a thermally isolated, closed system. Thermally isolated, closed systems may include devices without heat transfer equipment and/or thermal loss to the environment, such as a well insulated tank. In the alternative, systems with heat transfer or thermal equipment for heating and/or cooling the contents of the vessel benefit from the rapid mixing capabilities and/or performance of this invention, such as to heat a tank without or with reduced thermal gradients.

When the mixer includes a nozzle and/or an eductor, the amount liquid volume to reach homogeneity through the mixer is the primary or motive fluid and does not include the secondary or entrained fluid. Essentially, the contents of the vessel reach uniformity in a short period of time or short number of volume turnovers of the vessel. The ability to homogenize a tank in 1.0 turnover or less is a surprising and unexpected result, since the known industry practice specifies at least 3 turnovers of the entire liquid volume to be mixed.

Generally, lower viscosity liquids can be easier to mix and higher viscosity liquids can be more or much more difficult to mix. For example, water has a viscosity of about 1.0 centistokes at ambient conditions. Viscosity broadly refers a resistance of a fluid being deformed under stress. Viscosity herein refers generally to kinematic viscosity or a ratio of a viscous force to an inertial force, and typically can be expressed as absolute viscosity over density in units, such as centistokes or the like. Dynamic viscosity or absolute viscosity can be expressed in units, such as centipoise or the like. In the alternative, viscosity can be measured as Saybolt viscosity and can be expressed in units, such as Saybolt Universal Seconds (SUS).

Liquids used with this invention may include any suitable viscosity, such as from gasoline to heavy oils or asphalts. According to one embodiment, the liquids used with this invention may include a viscosity of at least about 500 centistokes, at least about 700 centistokes, at least about 850 centistokes, and/or any other suitable value. Viscosity values listed can be measured at a suitable temperature, such as operating or process conditions, above ambient conditions, about ambient conditions, and/or about 15 degrees Celsius, for example.

Generally, stratified liquids with lower density differences can be easier to mix and those with higher density differences can be more or much more difficult to mix. For example water has a density of about 1,000 kilograms per meter cubed at ambient conditions. Density broadly refers to a mass of a substance per unit volume and can be expressed in units, such as kilograms per meter cubed and the like.

Liquids used with this invention may include any suitable density or gravity, such as from gasoline to heavy oils or asphalts. According to one embodiment, the liquids used with this invention may include a density of at least about 500 kilograms per meter cubed, at least about 700 kilograms per meter cubed, at least about 800 kilograms per meter cubed, at least about 900 kilograms per meter cubed, at least about 1,000 kilograms per meter cubed, at least about 1,100 kilograms per meter cubed, and/or any other suitable value.

According to one embodiment, the invention may include a method of mixing a first fluid stratified on a second fluid. The method may include moving an inlet device based on a liquid level of the first fluid, withdrawing a portion of the first fluid with the inlet device, and combining the portion of the first fluid with a portion of the second fluid by at least one mixer.

Stratified broadly refers to at least a portion of one fluid being at least partially separated from at least a portion of a second fluid, such as dense liquid drain cleaner settling to the bottom of a sink containing water. Separation may include forming discrete layers, pockets, strata, and/or the like. Stratification may be exacerbated by density differences and/or viscosity differences. Stratification may occur between liquids that are completely miscible, such as two different crude oils. In the alternative stratification may occur between liquids that are immiscible, such as crude oil and water. In addition to relatively discrete layers, stratification may also include gradients and/or changes in a characteristic, such as generally without a definable interface. Suitable characteristics for gradients may include density, viscosity, temperature, composition, color, any measureable feature, and/or the like.

Generally, a less dense and/or less viscous material may collect and/or accumulate near a top of the liquid level. Generally, a more dense and/or more viscous material may collect and/or accumulate near a bottom of the vessel. Desirably, the inlet device draws in the lightest and/or lowest viscosity material, such as requiring minimal power input and having minimum frictional losses through a pipe and/or a mixer. Also desirably, the mixer returns the lightest and/or lowest viscosity material into the heaviest and/or greatest viscosity material. In the alternative, the inlet device may withdraw material from a bottom of the vessel and the mixer return the material to the top and/or near the liquid level.

The first liquid and the second liquid may have any suitable viscosity difference, such as at least about 50 centistokes, at least about 100 centistokes, at least about 150 centistokes, at least about 200 centistokes, at least about 300 centistokes, at least about 400 centistokes, and/or the like. Similarly, the primary fluid through the mixer may have a viscosity and the secondary or surrounding fluid may have a viscosity that is about ±50 centistokes from the first fluid, about ±100 centistokes from the first fluid, about ±150 centistokes from the first fluid, about ±200 centistokes from the first fluid, about ±300 centistokes from the first fluid, about ±400 centistokes from the first fluid and/or the like.

The first liquid and the second liquid may have any suitable density difference, such as at least about 10 kilograms per meter cubed, at least about 20 kilograms per meter cubed, at least about 50 kilograms per meter cubed, at least about 70 kilograms per meter cubed, at least about 100 kilograms per meter cubed, and/or the like. Similarly, the primary fluid through the mixer may have a density and the secondary or surrounding fluid may have a density that is about ±10 kilograms per meter cubed from the first fluid, about ±20 kilograms per meter cubed from the first fluid, about ±50 kilograms per meter cubed from the first fluid, about ±70 kilograms per meter cubed from the first fluid, about ±100 kilograms per meter cubed from the first fluid, and/or the like.

The total vessel volume generally includes the working volume for the fluid, such usable space in a tank. The method and apparatus of this invention may mix any suitable amount vessel volume, such as the inlet device moves with the liquid level. This design allows and/or facilitates mixing tanks that may be less than completely full, such as about 20 percent full, about 40 percent full, about 50 percent full, about 70 percent full, about 90 percent full, about 100 percent full, and/or the like.

Similarly, the method and apparatus of this invention may mix any suitable amount and/or ratio of first liquid to second liquid, such as 10 percent first liquid and 90 percent second liquid, such as 30 percent first liquid and 70 percent second liquid, such as 50 percent first liquid and 50 percent second liquid, such as 70 percent first liquid and 30 percent second liquid, such as 90 percent first liquid and 10 percent second liquid, and/or the like.

Systems and methods having more than two fluids and/or layers to homogenize are within the scope of this invention. Desirably, the invention can homogenize a vessel regardless of the number of layers, gradients, and/or the like. This invention can also homogenize a contents of the vessel regardless of order of the materials fed and/or flowed into the vessel, such as a heavy material followed by a light material, or a light material followed by a heavy material.

According to one embodiment, the first fluid and the second fluid together make a total liquid volume and the total liquid volume becomes generally homogenous following less than about 0.8 turnovers of the total liquid volume through the at least one mixer, less than about 0.6 turnovers of the total liquid volume through the at least one mixer, less than about 0.4 turnovers of the total liquid volume through the at least one mixer, and/or the like.

Generally, the vessel contents with two fluids can be completely homogenized with this invention as a direct correlation to amount of mixing required, such that taking the smallest fluid percentage in a decimal format and adding a little more (about 0.1) will convert to a number of turnovers for sufficient homogenization. For example, a tank with 70 percent fluid A and 30 percent fluid B (motive fluid) can be homogenized in about 0.4 turnovers (0.3±0.1). Similarly, a tank with 50 percent fluid A and 50 percent fluid B can be homogenized in about 0.6 turnovers (0.5±0.1).

According to one embodiment, the filling or flowing of liquids into or to the tank may utilize the mixer of this invention, such as to reduce mixing time.

EXAMPLES

Comparative Example 1

A first fluid with a density of 950 kilograms per meter cubed and a viscosity of 800 centistokes was layered on the bottom of a vessel using computational fluid dynamic simulation. A second fluid with a density of 850 kilograms per meter cubed and a viscosity of 900 centistokes was layered on the top of the first fluid. The layers each were equal in volume and represented 50 percent of the vessel. The vessel had a volume of 46,000 meters cubed.

The vessel was configured with a pump drawing suction near the bottom (1 meter above a bottom with a fixed location nozzle) and moving 4000 meters cubed per hour total flow. The vessel also included 72 jet mixers disposed 1 meter above the bottom of the vessel and the jet mixers pointed upward at 70 degrees. Each jet mixer had a flow of 56 meters cubed per hour of primary fluid and a total flow of 98 meters cubed per hour of total fluid (including secondary fluid).

Figure 11A:
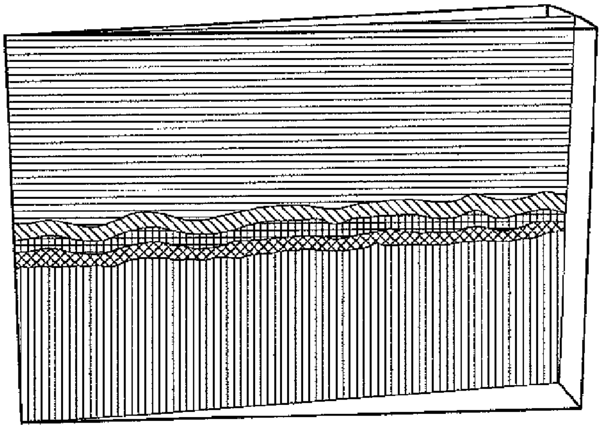
FIGS. 11A-11C illustrate a tank with stratified contents at various time intervals during mixing.
Figure 11B:
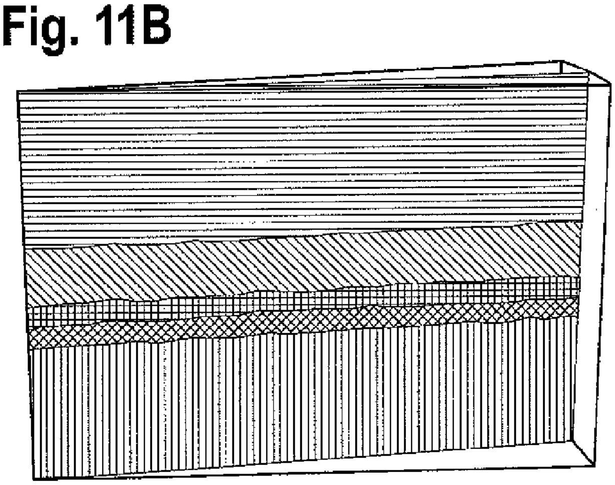
Figure 11C:
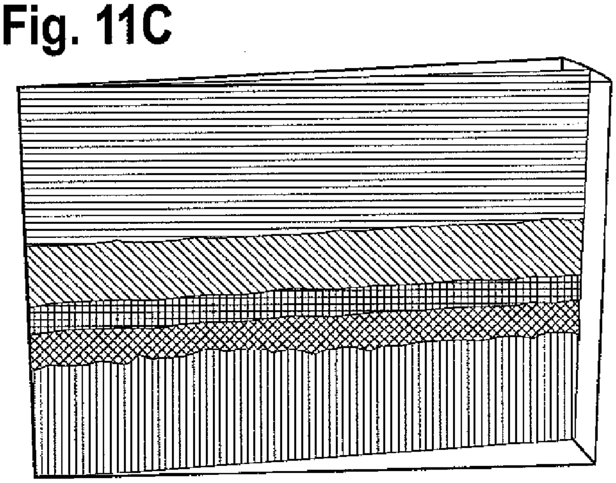

FIG. 11A shows a cross section of the initially stratified vessel at time equals zero. FIG. 11B shows a cross section of the vessel following 2 hours of mixing with a small intermediate layer forming. FIG. 11C shows a cross section of the vessel following 12 hours of mixing where the small intermediate layer has only slightly increased over the mixing of FIG. 11B. Very little mixing occurred after the first 2 hours, because the heavy fluid was drawn out near the bottom and mixed with the same heavy fluid at the bottom of the vessel. The density and viscosity of the mixture prevented it from pushing through to the lighter layer at the top of the vessel. The vessel remained unmixed indefinitely.

Comparative Example 2

The fluids and vessel of Comparative Example 1 were modeled by computational fluid dynamic simulation. This time the vessel had the suction withdraw from the middle of the vessel height by a fixed location nozzle.

A much greater portion of the vessel contents did mix, but the even after 48 hours (1.6 turnovers) the contents retained 10 percent of the initial stratification. Poor mixing occurred in the upper half of the tank due to the low bulk fluid velocities and the suction did not draw fluid from the top surface of the fluid. Additionally, this configuration required the tank to be at least one half full before circulation can be used which limited the functionality of the system.

Example 1

The fluids and vessel of Comparative Example 1 were modeled by computational fluid dynamic simulation. This time the vessel was configured according to this invention with a floating suction near the top of the liquid level at 19.5 meters. The pump drew suction from the floating suction at 4000 meters cubed per hour total flow per hour total flow. The vessel also included 72 jet mixers disposed 1 meter high on a bottom of the vessel and the jet mixers point upward at 70 degrees. Each jet mixer had a flow of 56 meters cubed per hour of primary fluid and a total flow of 98 meters cubed per hour of total fluid (including secondary fluid).

Figure 12A:
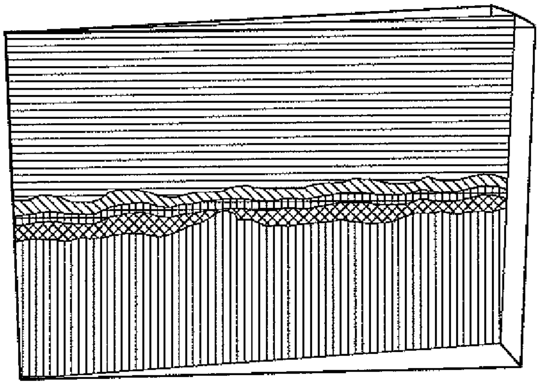
FIGS. 12A-12F illustrate a stratified contents of a tank at various time intervals during mixing, according to one embodiment.
Figure 12B:
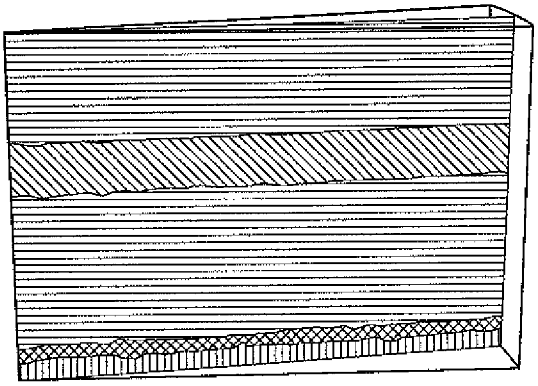
Figure 12C:
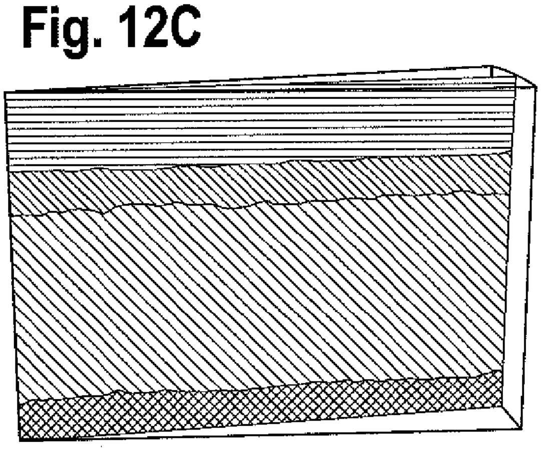
Figure 12D:
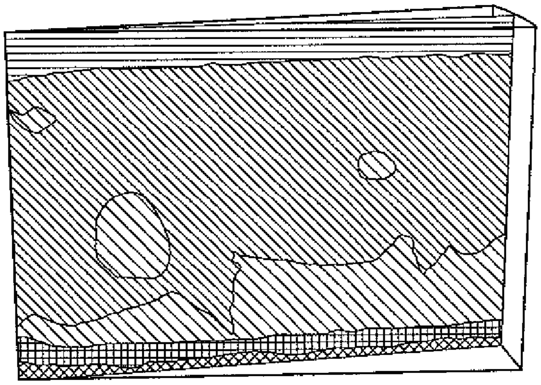
Figure 12E:
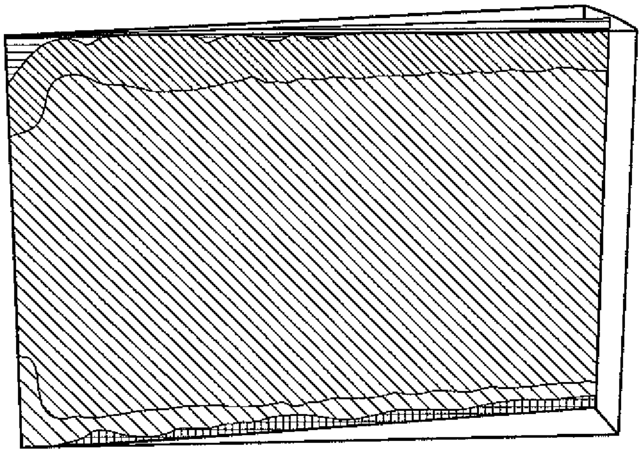
Figure 12F:
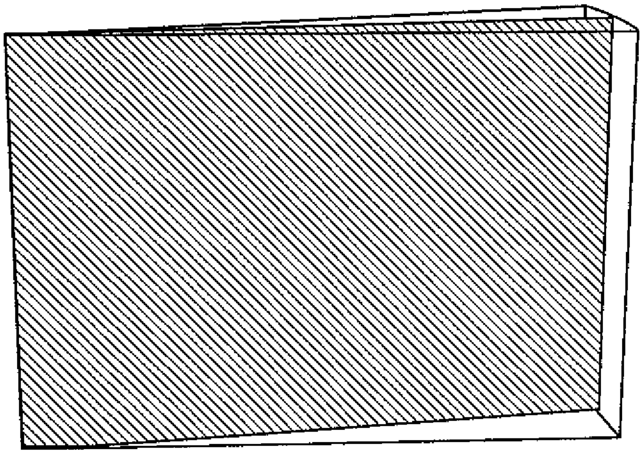

FIG. 12A shows a cross section of the initially stratified vessel at time equals zero. FIG. 12B shows a cross section the vessel following 1 hour of mixing with a significant reduction in the bottom layer to an intermediate layer forming. FIG. 12C shows a cross section of the vessel following 2 hours of mixing where over 60 percent of the vessel already has been substantially mixed. FIG. 12D shows a cross section of the vessel following 3 hours of mixing where only slight areas of gradients remained at the very top and the very bottom of the vessel. FIG. 12E shows a cross section of the vessel following 4 hours of mixing where only a small region of non-uniform material remained. FIG. 12F shows a cross section of the vessel with completely homogenous contents following 6 hours of mixing.

Complete mixing occurred after 6 hours of mixing because the light fluid drawn from the floating suction mixed with the heavy fluid at the bottom of the tank. Buoyancy driven forces assured the mixture continued to move upward until the contents of the vessel were completely mixed.

The apparatus of Example 1 succeed in mixing the vessel where the Apparatus of Comparative Example 1 could not due to density and/or viscosity differences. Surprisingly and unexpectedly, Example 1 succeeded in mixing the vessel in a short time of only 6 hours which was 0.52 turnovers of the liquid volume through the mixer. The apparatus of Example 1 mixed the vessel more completely and much more quickly than the apparatus of Comparative Example 2.

Example 2

The fluids of Comparative Example 1 were modeled by computational fluid dynamic simulation. The vessel had a volume of 118,000 meters cubed. This time the vessel was configured according to this invention with a floating suction near the top of the liquid level of 19.5 meters and having a downward orientation at a depth of 1 meter. The pump included a circulation rate of 4500 meters cubed per hour. The eductors were arranged with 48 outer jets and 24 inner jets in a circular orientation with 63 meters cubed per hour motive jet flow and 125 meters cubed per hour total (including secondary entrainment flow) per jet. All eductors faced upwards at 70 degrees and at a height of 1 meter from the bottom of the vessel.

The resulting simulation showed very little circulation below the eductors, so about the bottom 1 meter of the vessel remained unmixed (about 10 percent) after 18 hours or 0.61 turnovers. Similarly, the downward facing floating suction did not facilitate mixing in about the top 1 meter of the fluid (about 10 percent) after 18 hours of 0.61 turnovers. The discharge from the vessel is somewhat variable regardless of being drawn from a bottom nozzle or the floating suction.

Example 3

The fluids and vessel of Example 2 were modeled by computational fluid dynamic simulation. This time the vessel was configured according to this invention with a floating suction near the top of the liquid level and having an upward orientation at a depth of 1 meter. The eductors were arranged with 60 facing upward at 70 degrees, and 12 eductors horizontal with a 45 degree inward orientation. All eductors had a height of 1 meter from the bottom of the vessel.

With the above configuration the mixing improved so that in 18 hours (0.61 turnovers) greater than 99 percent homogeneity was achieved including the top 1 meter and the bottom 1 meter. The resulting tank discharge is uniform from a bottom nozzle and/or the floating suction.

Example 4

The vessel of Example 2 was modeled by computational fluid dynamics where the first fluid and the second fluid had the same viscosity (850 centistokes) and the same density (900 kilograms per meters cubed). The top layer was at 400 degrees Celsius and the bottom layer was at 300 degrees Celsius. This modeling assumed no change in density with temperature over the 100 degrees Celsius difference of the liquids. Molecular thermal diffusion was turned off during the modeling. The pumping conditions were those of Example 2. The floating suction had an upward facing orientation and the eductors included 60 eductors facing upwards at 70 degrees and 12 facing horizontal with 45 degrees inward orientation and a height of 1 meter.

There were equal amounts of the top fluid and the bottom fluid. When there were no density and/or viscosity differences between the fluids, the tank became greater than 99 percent mixed after 1.2 hours (0.05 tank turnovers). The discharge from the tank is consistent regardless of location.

It will be apparent to those skilled in the art that various modifications and variations can be made in the disclosed structures and methods without departing from the scope or spirit of the invention. Particularly, descriptions of any one embodiment can be freely combined with descriptions or other embodiments to result in combinations and/or variations of two or more elements or limitations, Other embodiments of the invention will be apparent to those skilled in the art from consideration of the specification and practice of the invention disclosed herein. It is intended that the specification and examples be considered exemplary only, with a true scope and spirit of the invention being indicated by the following claims.

What is claimed is:

1. A method of mixing a liquid in a vessel, the method comprising:

moving an inlet device based on a liquid level;

withdrawing a portion of the liquid from a region at or near a top surface of the liquid within the vessel using the inlet device, wherein the inlet device comprises a floating suction; and returning the portion of the liquid to a different part of the vessel with at least one mixer;

wherein a density difference between the liquid in the region at or near the top surface of the liquid within the vessel and the liquid in the different part of the vessel is at least about 20 kilograms per meter cubed; and the method results in a reduced mixing time compared to using an inlet device that does not include a floating suction.

2. The method of claim 1, wherein the different part of the vessel comprises a bottom part of the vessel.

3. The method of claim 1, wherein the step of returning comprises applying a motive force to the portion of the liquid.

4. The method of claim 1, wherein at least one mixer comprises an eductor, a nozzle, or an impeller.

5. The method of claim 1, wherein the liquid comprises a liquid volume; and comprising achieving a homogenous mixture of the contents of the vessel following less than about 1.0 turnover of the liquid volume returned through the at least one mixer, wherein homogenous comprises a lack of composition gradients or a lack of thermal gradients of greater than about 1 percent of an initial gradient for a thermally isolated, closed system.

6. The method of claim 5, comprising achieving a homogenous mixture of the contents of the vessel following less than about 0.8 turnovers of the liquid volume returned through the at least one mixer.

7. The method of claim 5, comprising achieving a homogenous mixture of the contents of the vessel following less than about 0.6 turnovers of the liquid volume returned through the at least one mixer.

8. The method of claim 1, wherein the liquid comprises a viscosity of at least about 500 centistokes.

9. The method of claim 1, wherein the liquid comprises a viscosity of at least about 850 centistokes.

10. The method of claim 1, wherein a height of the liquid in the vessel comprises less than about half a height of the vessel.

11. The method of claim 1, wherein the liquid is one selected from the group consisting of crude oil, refinery streams and combinations thereof.

12. The method of claim 1, comprising using a plurality of mixers to return the portion of the liquid to the different part of the vessel.

13. The method of claim 12, wherein the plurality of mixers is disposed on a tank bottom, with at least one mixer pointed upward and at least one mixer pointed horizontally to form a toroidal flow pattern.

* * * * *